United States Patent [19]

Bunn

[11] Patent Number: 5,170,042
[45] Date of Patent: Dec. 8, 1992

[54] IDENTIFICATION OF ELECTRO-FUSION FITTINGS

[75] Inventor: Albert K. Bunn, Blyth, United Kingdom

[73] Assignee: British Gas plc, London, England

[21] Appl. No.: 623,977

[22] PCT Filed: May 4, 1990

[86] PCT No.: PCT/GB90/00698

§ 371 Date: Dec. 19, 1990

§ 102(e) Date: Dec. 19, 1990

[87] PCT Pub. No.: WO90/13410

PCT Pub. Date: Nov. 15, 1990

[30] Foreign Application Priority Data

May 8, 1989 [GB] United Kingdom ................ 8910509

[51] Int. Cl.$^5$ ........................... H05B 1/02; H05B 3/48
[52] U.S. Cl. ..................................... 219/497; 219/535
[58] Field of Search ............... 219/497, 499, 501, 541, 219/544, 535

[56] References Cited

U.S. PATENT DOCUMENTS

| Re. 33,716 | 10/1991 | Johnson | 219/541 |
| 4,486,650 | 12/1984 | Bridgstock | 219/544 |
| 4,571,488 | 2/1986 | Reeves | 219/544 |
| 4,994,655 | 2/1991 | Handa | 219/535 |

FOREIGN PATENT DOCUMENTS

| 0076043 | 6/1983 | European Pat. Off. |
| 0151340 | 8/1985 | European Pat. Off. |
| 189918 | 8/1986 | European Pat. Off. |
| 2137026 | 9/1984 | United Kingdom |
| 2174955 | 11/1986 | United Kingdom |

Primary Examiner—Teresa J. Walberg
Attorney, Agent, or Firm—Larson & Taylor

[57] ABSTRACT

An electro-fusion fitting (10) includes a body (12) of thermoplastics e.g. polyethylene, with a heater element (14) connected to heater terminals (16, 18) and identification devices (60, 62) moulded in the body (12). The devices are connected to the heater terminals and to identification terminals (20, 22). A control unit (24) connects a reference voltage (74) in turn to the device (60) and then to the device (62). In each case the device forms a voltage divider with a resistance (80) so that the value of the device is found. The two values identify the fitting so that the time the element (14) is energized can be set automatically by the unit (24) for each different size or kind of fitting. Neither device is required to be a specially accurate component and the range of values of the devices is less than it would be for a given range of fittings if only one device was used per fitting.

5 Claims, 5 Drawing Sheets

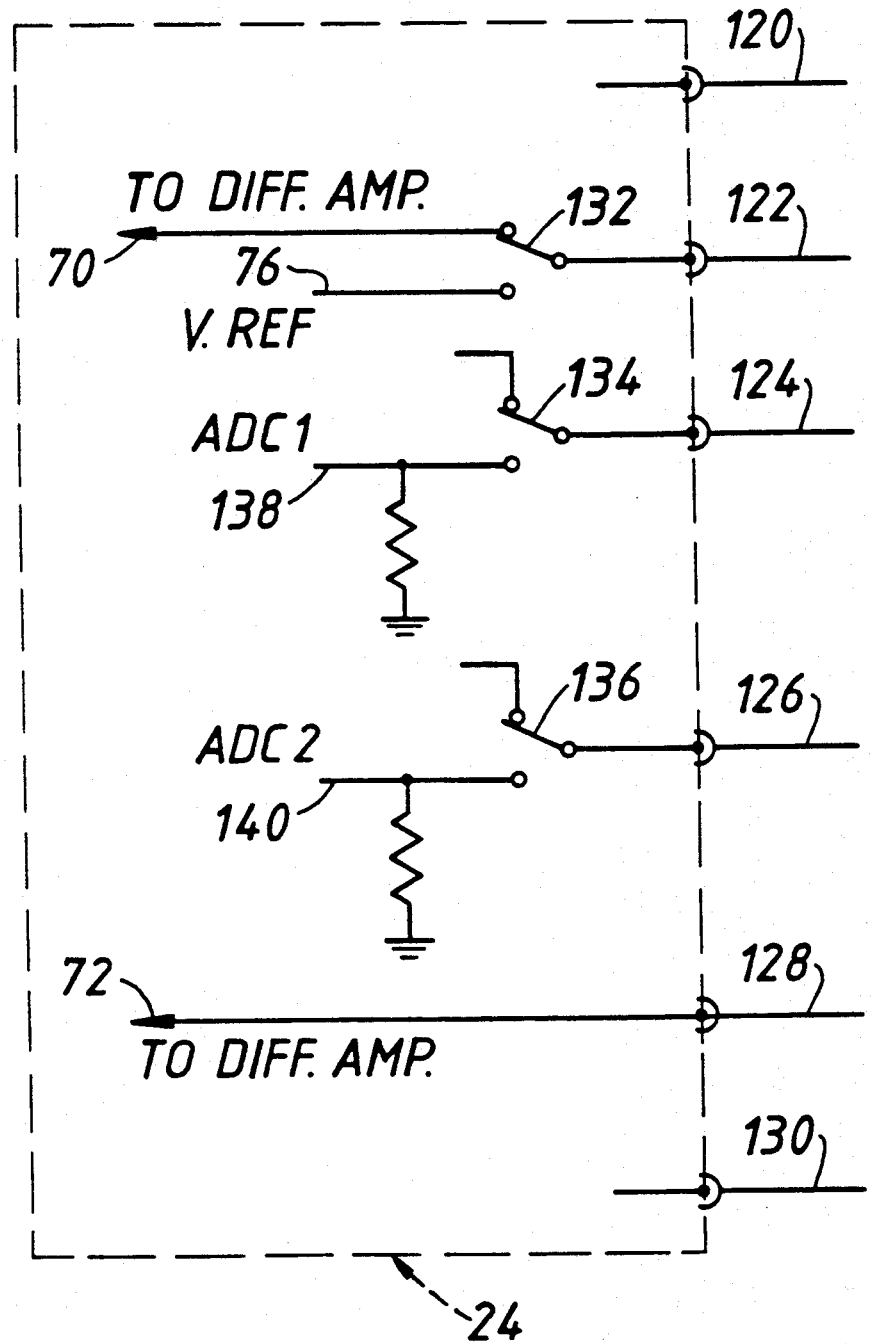

IDENTIFICATION OF ELECTRO-FUSION FITTINGS

BACKGROUND OF THE INVENTION

1. Field of the Invention

The invention relates to identification of electro-fusion fittings.

Such fittings are well-known and such fittings of one kind are used for joining lengths of thermoplastics pipe e.g. polyethylene pipe end-to-end. There are also other kinds of electrofusion fittings e.g. saddle-T kind which can be joined to the side surface of a main pipe to provide a stub to which a branch pipe can subsequently be joined.

Such fittings have an electrically conductive heater element which is energised, in use, by means of a control unit to which the fitting is connected using a lead or leads each of which terminates in a connector which is engageable with a respective one of two heater terminals on the fitting. In order that human error be eliminated as far a possible it is required that the fitting be identified from the range of fittings each of which has a predetermined characteristic, such as the time of electrical energisation for example, by the control unit.

2. Description of the Related Art

Such fittings are described in European Patent Specification No. 0076043 (Vectstar Limited) which shows a resistor connected between a terminal of the heater element and an auxilary terminal. The fitting described has two identical resistors, one connected to each heater element terminal so that one or other of the two resistors is effectively connected to the circuitry of the control unit whichever way round the fitting is connected to the leads. In other words, the provision of two resistors means that the fitting is not "handed" and is symmetrical so far as the control unit is concerned. The two resistors are not used together to determine the voltage used to identify the fitting. Either one or the other is used alone to determine that voltage.

Before power is applied to the fitting, a connection is made by the control unit which makes a voltage divider network including the resistor and a fixed resistor. The network is energised by a reference voltage and a voltage across the fixed resistor is measured. This voltage is used to identify the characteristic of the fitting e.g. the time of electrical energisation of the heating element of the fitting.

By using a single resistor to determine the voltage used to identify the fitting it is not possible to identify a range of fittings, say thirty or so, without using carefully chosen resistances. Such resistances are not available in the course of manufacture of electro-fusion fittings. If ordinary resistances are used having the normal error in their value, the differences which must be chosen between different values of resistors, to allow for the errors, would be excessively great.

By using a single resistor to determine the voltage used to identify the fitting it is not possible to identify a range of fittings, say thirty or so, without using carefully chosen resistances. Such resistances are not available in the course of manufacture of electro-fusion fittings. If ordinary resistances are used having the normal error in their value, the differences which must be chosen between different values of resistors, to allow for the errors, would be excessively great.

SUMMARY OF THE INVENTION

The object of the invention is to identify fittings from a range of fittings by using the two values of voltage.

A system for the identification of an electro-fusion fitting from a range of fittings each of which has a predetermined characteristic, such as the time of electrical energisation for example, according to the invention comprises a control unit which is connected to the fitting and which forms a voltage divider network including a fixed resistor and is characterised in that there are two identification resistors in or associated with the fitting and the control unit first forms the divider network including the first identification resistor and determines a first voltage across the fixed resistor then substitutes the first by the second identification resistor and determines a second voltage across the fixed resistor, the first and second voltages being used to determine the desired predetermined characteristic of the fitting.

In one form of the invention the identification resistors are both part of the fitting.

In this form of the invention each identification resistor is connected between one of two heater terminals and one of two identification terminals.

BRIEF DESCRIPTION OF THE DRAWINGS

Embodiments of the system embodying an electro-fusion fitting will now be described by way of example with reference to the accompanying drawings, in which:

FIGS. 4 and 5 are diagrammatic representations of a fourth and a fifth embodiment of the system.

DESCRIPTION OF THE PREFERRED EMBODIMENTS

Figure 1:
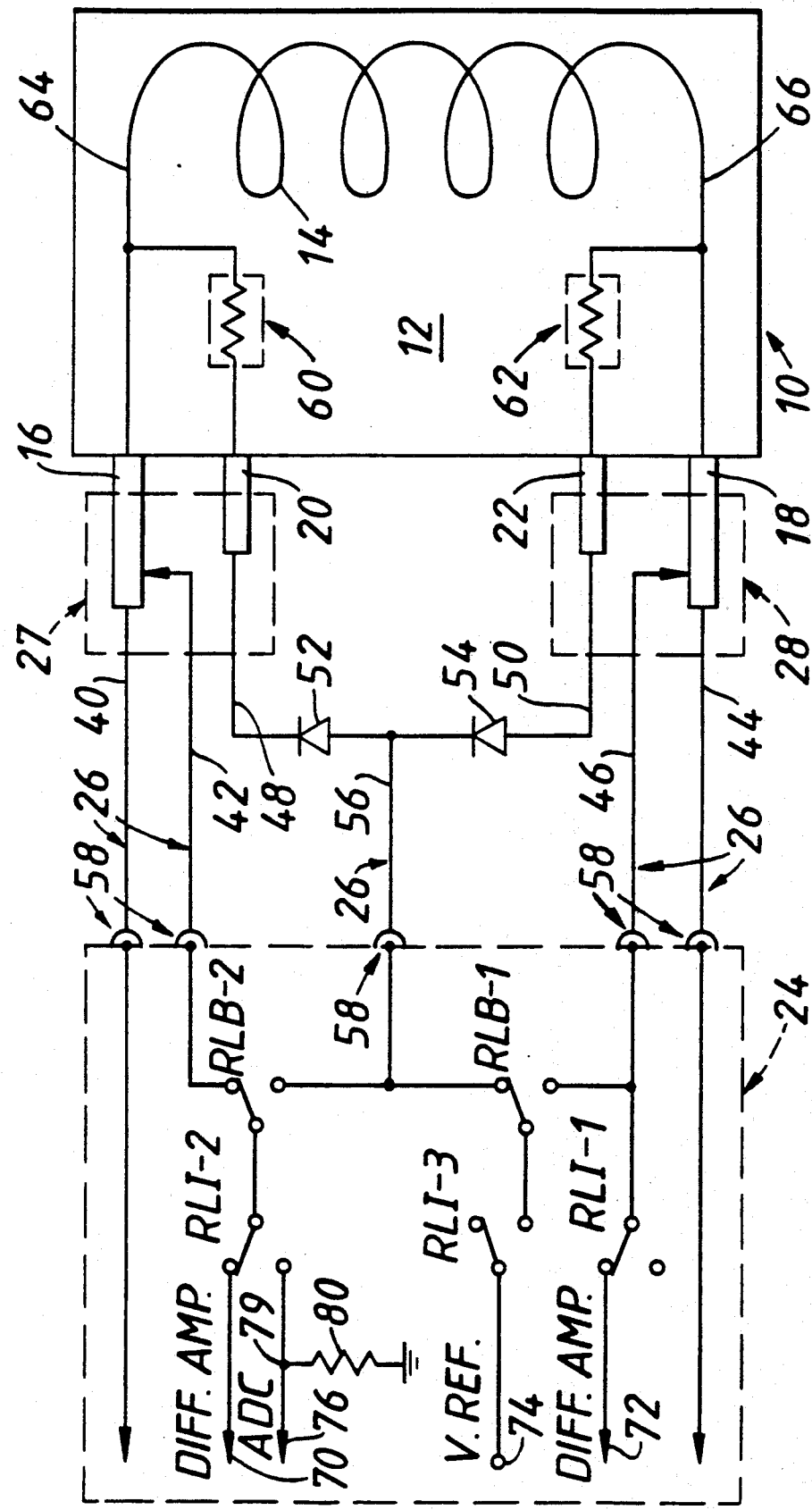
FIGS. 1 and 2 are diagrammatic representations of first and second embodiments of the system, respectively, also showing leads connecting the fitting to circuitry forming part of a control unit.
Figure 2:
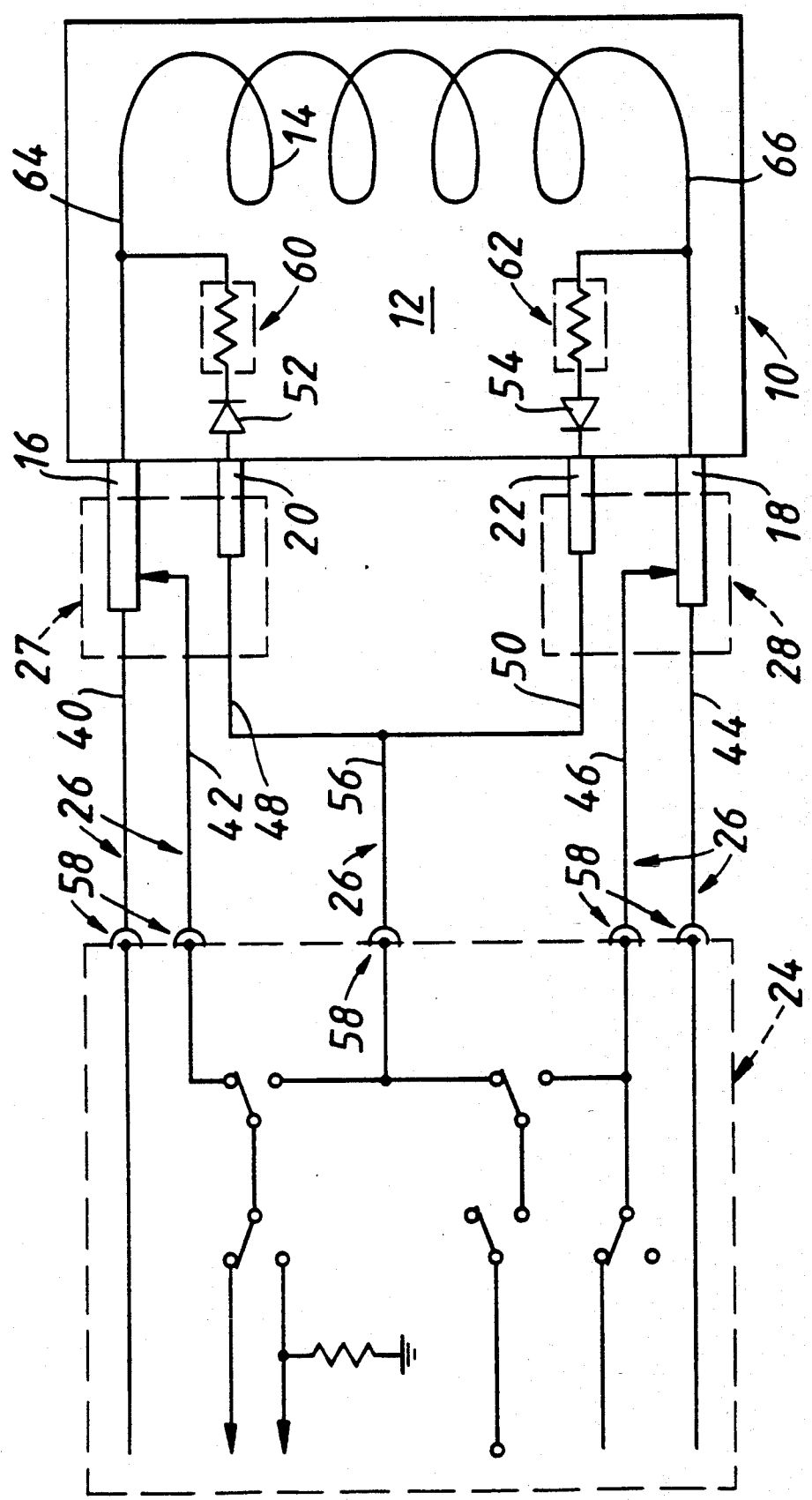

FIGS. 1 and 2 show the following principal items: an electro-fusion fitting 10 comprising a body 12 of thermoplastics material carrying on electrically conductive heater element 14; heater terminals 16, 18 between which the heater element 14 is connected and identification terminals 20, 22 the terminals being supported on the body 12; a control unit 24; and electric leads 26 extending from the control unit 24 and terminating in connectors 27, 28 which connect the leads to the fitting 10.

The fitting is shown diagrammatically and it will be understood that it may be one of several different kinds e.g. a coupler in which the body 12 e.g. of polyethylene is a hollow generally circular cylindrical moulding having the element 14 embedded in the body 12 close to the inner cylindrical surface. Such a coupler would be used for joining thermoplastics e.g. polethylene gas or water pipes end to end. In use the ends of the pipes are pushed into the coupler and the element 14 is energised to fuse and join together material of the 12 and of the pipe ends. It will be understood that the element 14 extends completely around the bore of the fitting and encircles the pipe ends.

Another kind of fitting has a saddle-shaped body with the heater element embedded in the body close to the concave surface of the saddle which is intended in use to engage an outer side surface of a pipe. Such a fitting includes a hollow stub to which a branch pipe can be connected once the fitting has been joined by fusion to the pipe. The invention is applicable to those and other kinds of electro-fusion fitting and the illustration of the fitting in the drawings is purely by way of example.

The body 10 has two integrally moulded shrouds (not shown) which surround the terminals 16, 20 and 18, 22 respectively and which receive the connectors 27, 28 respectively. Within each connector 27, 28 there are electrically conductive contact parts (not shown) which are connected to the ends of the conductors within the leads 26. Those contact parts provide electrical connection between the respective conductors and the terminals 16, 20 and 18, 22 when the connectors 27, 28 are engaged.

In the particular example shown two conductors 40, 42 are thus connected to the terminal 16 and two conductors 44, 46 are connected to the terminal 18. The conductors 42 and 46 are connected via respective contact parts which engage the sides of the terminals 16, 18. The conductors 40, 44, in use, provide paths for the current which energises the element 14 to effect fusion and they need not be considered further. In this particular example, the conductors 42, 46 provide paths by which the electrical continuity of the element 14 can be checked before use and also provide paths which are used in the stage during which the fittng is identified by the control unit 24.

The contact parts in the connectors 27, 28 also connect conductors 48, 50 to the terminals 20, 22 respectively. Those conductors include respective diodes 52, 54 and they are commoned at one end of a further conductor 56.

It will be understood that the conductors 40, 42, 44, 46, 48, 50 and 56 and the diodes 52, 54 are all incorporated in a cable assembly generally referred to as the leads 26. The conductors are connected by further connectors, indicated at 58, to circuitry within the control unit 24. The cable assembly conveniently is Y-shaped having the connectors 27, 28 at respective ends of the arms of the Y and the connectors 58 forming a unitary bayonet connector at the free end of the stem of the Y.

The terminals 20, 22 are connected via resistors 60, 62 respectively, to end portions 64, 66 respectively of the heater element 14. Thus, the resistors 60, 62 are effectively connected between the terminals 20 and 16 and between the terminals 22 and 18, respectively. The resistors are, for example, enclosed within the body 12 in the course of moulding of the body. FIG. 2 differs from FIG. 1 in that the diodes 52, 54 are included in series with the resistors 60, 62 respectively, between the terminals 20, 22 respectively and the end portions 64, 66 respectively, instead of being incorporated in the conductors 48, 50 in the leads 26.

For example, the diodes 52, 54 are enclosed with the resistors 60, 62 within the body 12 in the course of moulding. The FIG. 1 and 2 are best further described by way of the description, with reference to FIG. 1, of the operation of the control unit and the fitting which follows next.

OPERATION

As will be understood, once the fitting 10 has been properly positioned in relation to the pipe or pipes to which it is to be joined by fusion, it is connected by the leads 26 to the control unit 24. The control unit is switched on and thereafter its various stages of operation are performed automatically. Those stages include (i) a checking stage when the electrical continuity of the heater element 14 is checked; (ii) a fitting recognition or identification stage; and (iii) a fusion stage when the element 14 is energised to effect the joining of the fitting by fusion to the pipe or pipes. This invention is particularly concerned with stage (ii) and only part of the circuitry within the control unit 24 has been shown accordingly. The circuitry not shown, in this example, includes a differential amplifier and an analogue-to-digital converter and relays RLI and RLB. The relay RLI controls contacts RLI-1, RLI-2 and RLI-3 and the relay RLB controls the contacts RLB-1 and RLB-2. FIGS. 1 and 2 show the relay contacts in their positions corresponding to the non-operated condition of the relays RLI and RLB.

To commence the identification stage the relay RLI is operated so that its contacts RLI-1, RLI-2 and RLI-3 change over. This disconnects the differential amplifier, connected to the terminals 70, 72 and instead connects the contact RLB-1 and conductor 56 to a reference voltage on the terminal 74; it also connects the contact RLB-2 and the conductor 42 to the analogue-to-digital converter (ADC) connected to the terminal 76. The latter is also connected to earth via a reference resistance 80.

The diode 52 is forward-biased and acts like a closed switch. The diode 54 is reverse-biased and acts like an open switch. Thus, the reference voltage on the terminal 74 is connected via contacts RLI-3 and RLB-1, conductor 56, diode 52, conductor 48, terminal 20 to the resistor 60 and thence via the terminal 16, conductor 42, contacts RLB-2 and RLI-2 to the resistance 80 and the ADC. The resistances 60 and 80 form a voltage divider. The division ratio of the divider is determined by the value of the resistor 60, the value of the resistor 80 being fixed. The ADC can therefore measure the value of the voltage developed across resistor 80. The value found is stored.

Next, with the relay RLI still operated, the relay RLB operated. This connects the reference voltage on the terminal 74 to the conductor 46 and connects the ADC and the resistance 80 to the conductor 56. Thus, the diode 54 becomes forward biased and acts like a closed switch and the diode 52 is switched out of circuit. Thus the reference voltage is connected via the relay contacts RLI-3 and RLB-1, the conductor 46 and the terminal 18 to the resistor 62 and thence via the terminal 22 the conductor 50 the diode 54, the conductor 56 and the relay contacts RLB-2 and RLI-2 to the ADC and the resistance 80. As before, voltage division occurs, this time in the ratio of the resistor 62 to the resistance 80. The ADC effectively measures the voltage drop across resistor 80 owing to this division ratio and the value is stored.

The set of two values, say V1 and V2 respectively, produced by the resistors 60 and 62 identifies the fitting 10. In this example, the set of two values is matched by the control unit with sets of values in a look-up table and where matching occurs a value is found for the time during which the element 14 is to be energised in order to ensure that the fitting is satisfactorily joined to the pipe or pipes. The control unit automatically controls the time of energisation accordingly when the energisation stage is reached.

Current is supplied to the element 14 in that stage via the conductors 40, 44.

The connectors 27, 28 can be connected to the fitting 10 either way round, in other words the connector 27 could, alternatively, have been fitted to the terminals 18, 22 and the connector 28 to the terminals 16, 20 instead as shown in FIG. 1. The only difference in operation would be that since the diode 52, now connected to the terminal 22, is the first diode to be forward-biased, the voltages produced by the resistors 60, 62 would now be found in the order V2, V1 instead of V1, V2.

It is preferred, though it is not essential, that the control unit uses the set of two values of voltage given by the resistors 60, 62 without regard to the order in which the two values are found. In other words, V1, V2 is always equivalent to V2, V1 so that the set of values found is the same regardless of which way round the connectors 27, 28 are connected to the fitting 10. In other words, although the fitting 10 is not wholly symmetrical because in general the two resistors 60, 62 will have different values of resistance i.e. the fitting is "handed", the control unit in that preferred form readily identifies the fitting 10 correctly.

The fitting 10 shown in FIG. 2 has the diodes 52, 54 incorporated in its body 12 instead of their being incorporated in the leads 26.

Whichever way round the connectors 27, 28 are connected to the fitting shown in FIG. 2, the diode 52 is the first diode to be forward-biased and so the voltage developed by resistor 60 is always determined first. Otherwise, the description of the operation of the fitting with reference to FIG. 1 applies to the fitting shown in FIG. 2.

In the case of the fitting shown in FIG. 2, the order in which the values occur in the set of values found i.e. the order in which the values are determined by the control unit is significant. In other words, a fitting in which the values are found in the order V1, V2 can be distinguished from another kind of fitting in which the values are found in the order V2, V1.

The use of two voltage values determined as described above gives two important advantages.

Firstly, the identification of different fittings, e.g. fittings of different type or fittings of different sizes can be achieved virtually independently of variations, within a normal production band, in the resistance values of the resistors 60, 62. Unless resistors are specially selected, it is likely that they will have an error of some 2% in their resistance values. If only a single value is used to identify each fitting, smaller increments of voltage must be measured and it is difficult to eliminate the effect of resistance variations upon the reliability of identification.

Secondly, the span of values can be less than would be the case if only one value is assigned to each different fitting.

Those advantages can be understood by comparing ten different fittings identified by respective sets of two values, assuming that the minimum acceptable difference between adjacent values is unity and that the order of the values in the sets is not significant.

Using single values, the fittings would be represented for example by the resistance values one to ten. The total span is ten.

Using sets of values, each set being two values, the values used could be, say one, three, five and seven, for example, the minimum difference betwween adjacent values now being two, so that the effects of errors in the individual values are greatly reduced. The span of values is only seven.

The ten sets of values are: 1,1; 1,3; (or its equivalent) 1,5 or 5,1; 1,7 or 7,1; 3,3; 3,5 or 5,3; 3,7 or 7,3; 5,5; 5,7 or 7,5; and 7,7.

If the order of the values in each set is significant e.g. using the fitting as shown for example in FIG. 2 a range of sixteen different fittings can be identified.

The values used above by way of example are not necessarily those which would be used in practice.

By way of example, a range of 36 different fittings may be identified using eight resistance values for each of the two resistors 60, 62 between 18 kil-ohms and 390 ohms, with a minimum voltage increment of 0.5 volts between the values of voltage determined by the resistor 60 or 62 and the resistor 80. The voltage value which is determined is that developed at the junction 79 in FIG. 1. The resistor 80, for example, has a value of 2.2 kil-ohms and the reference voltage was 5 volts. The diode 52 (or 54) requires 0.5 volt potential drop across it, thus the effective reference voltage is 4.5 volts. Thus, for the 18 kil-ohm value of resistance, say, for the resistor 60 the value of the potential at 79 can be found from the formula: $(4.5)\ (2.2\times 10^3)/(18\times 10^3 + 2.2\times 10^3)$ i.e. approximately 0.45 volt. The values of the resistances in the fittings used for the resistor 60 were: 18 k-ohms; 8.2 k-ohms; 4.7 k-ohms; 3 k-ohms; 2 k-ohms; 1.2 k-ohms; 750 ohms; and 390 ohms. The same values were used for the resistor 62. The voltages at 79 were: 0.45; 0.95; 1.44; 1.91; 2.35; 3.09; 3.41; and 3.84 volts.

The fittings were not "handed", so two values e.g. 0.45 and 1.91 (determined for the resistors 60, 61 respectively) were treated the same as 1.91 and 0.45 (determined for the resistors 60, 61 respectively). There were eight values determined for the resistors which were inherently unhanded namely, the eight pairs of values in which the same resistance was used for each resistor i.e. pairs of equal voltages 0.45, 0.45; 0.95, 0.95; etc were detected Thus, the total of values, each representing a different type of fitting was 8+half (64-8) i.e. 36.

In the case of both the fitting shown in FIG. 1 and that shown in FIG. 2, the two resistors 60, 62 and the two diodes 52, 54 remain in parallel with the heater element 14 during the fusion stage when the element is energised by alternating voltage provided by the control unit 24 on the conductors 40, 44. However, the resistors 60, 62 are always of relatively high value so that only a relatively small current flows through the resistors 60, 62 during those half-cycles. Thus, the presence of the parallel path through the resistors 60, 62 and diodes 52, 54 does not affect the heating stage and the diodes are not put at risk owing to the current-limiting effect of the resistors 60, 62.

Figure 3:
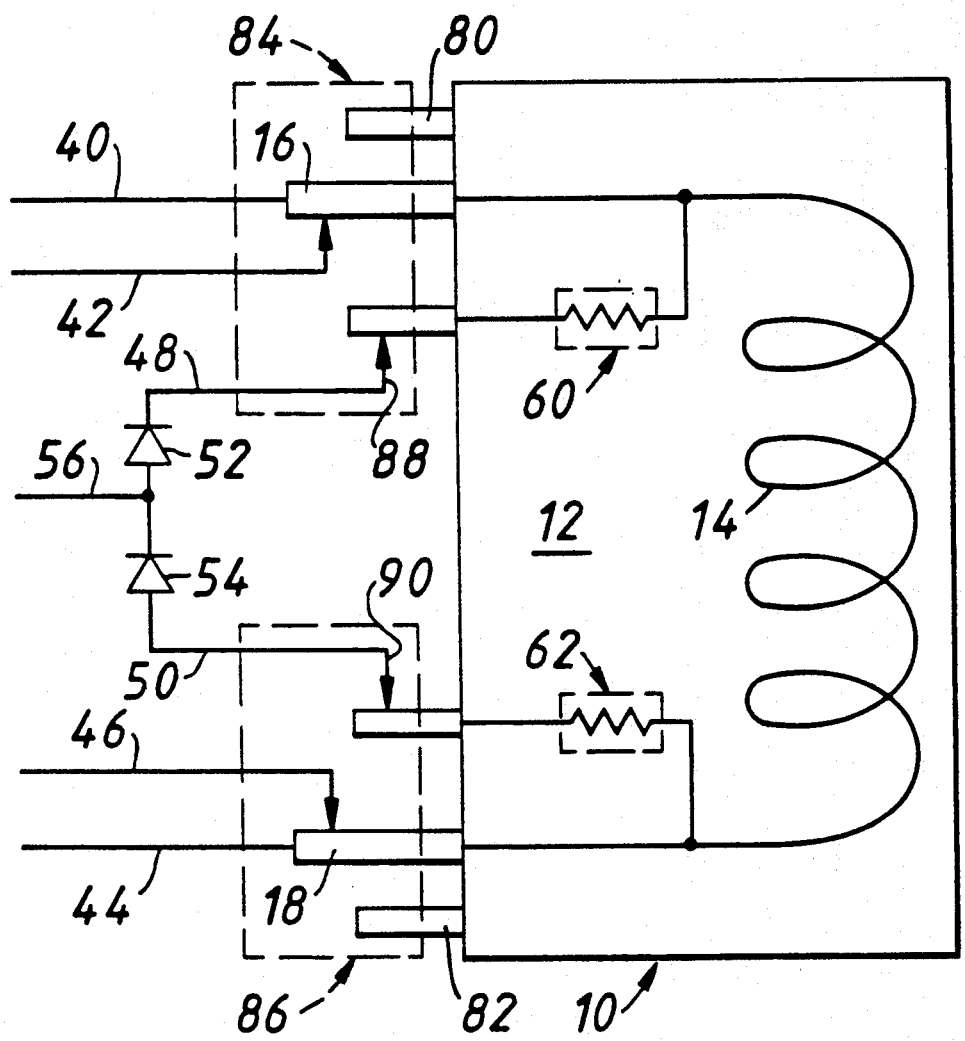
FIG. 3 is a diagrammatic representation of a modification of connectors and terminals.

FIG. 3 shows a modification in which terminals in the form of hollow, cylindrical sleeves 80, 82 encircling the terminals 16, 18 respectively, are provided on the fitting 10 instead of the pin-shaped terminals 20, 22. The connectors 84, 86 shown in FIG. 3 are modified slightly to provide contact parts (not shown) indicated at 88, 90 respectively, which slidingly engage the outer surfaces of the sleeves 80, 82 respectively, instead of the abutting contact parts of the connectors 27, 28 shown in FIGS. 1 and 2.

Figure 4:
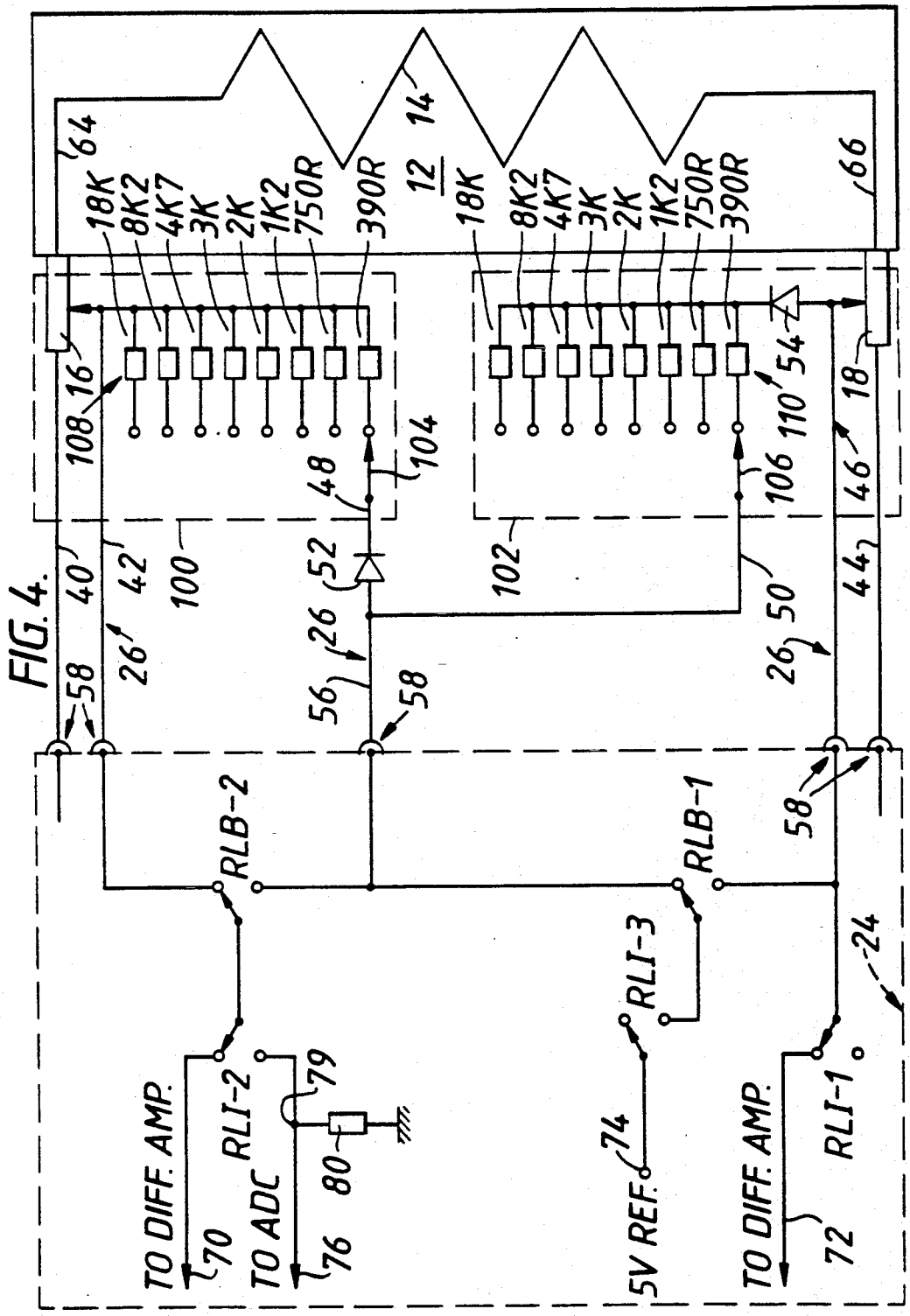

FIG. 4 shows a fourth form of system in which the identification resistors form part of connectors 100, 102 instead of forming part of the fitting 10 and the identification resistors are selected in the course of connecting the fitting 10 to the lead system 26. Each connector 100, 102 contains a rotary selector switch 104, 106 and the connector 100, 102 and the co-operating part of the fitting 10 (not shown) is such that the selector switch must be turned to a predetermined position to suit that particular type of fitting. The details do not form part of this invention. Full particulars can be obtained from our European Patent No. 151340. The effect of the connector 100 is to provide a resistor chosen from the bank 108 which is equivalent to the resistor 60 shown in FIG. 1; the effect of the connector 102 is to provide a resistor chosen from the bank 110 which is equivalent to the resistor 62 shown in FIG. 1. The operation of the circuit is exactly as described with reference to FIG. 1.

FIG. 5 shows an arrangement in which there are six conductors 120, 122, 124, 126, 128 and 130 between the control box 24 and the fitting. These conductors correspond, so far as their connections to the fitting are concerned, to the conductors 40, 42, 48, 50, 46 and 44, respectively, shown in FIGS. 1 to 4.

In this arrangement, no diodes 52, 54, nor the conductor 56, are used. In the control box, a relay contact 132 is used to switch between the differential amplifier on 70 and the voltage reference on 76. Two further relay contacts 134, 136 are used to connect to soft-ware arrangements for the analogue to digital converter. There are two channels shown for the ADC and an internal soft-ware switch selects which channel is connected. To read the values of the voltage drops of the resistors 60, 62 in the fitting, or the voltage drops created by the two resistors selected by the rotary selector switch 104 or 106, the contacts 134, 136 change over and the software switch selects the channel ADC-1 represented at 138. The circuit is then from the voltage reference connection 76, the contact 132, the conductor 122, the terminal 16 on the fitting, the resistor (not shown), the terminal 20 (using the FIG. 1 fitting for example), the conductor 124, the contact 134 and the ADC connection at 138.

For the other resistor, the channel at 140 is selected. The circuit is from the voltage reference connection 76, the conductor 122, the terminal 16 on the fitting, the low-resistance element 14, the other resistor (not shown), the terminal 22, the conductor 126, the contact 136 and the connection at 140 to the ADC.

When applied to a fitting of the type shown in FIG. 4 the respective circuits are: (i) from the voltage reference connection 76, the contact 132, the conductor 122, the resistor in the connector 100, the conductor 124, the contact 134 and the ADC connection at 138, and (ii) from the voltage reference connection 76, the contact 132, the conductor 122, the terminal 16, the element 14, the terminal 18, the other resistor in the connector 102, the conductor 126, the contact 136 and the ADC connection 140.

It will be understood that conveniently, for example, the conductors 120–130 are combined into a Y-shaped cable assembly in this embodiment too. The connectors 27, 28 (say) at respective ends of the arms of the Y having contact parts connected to the conductors 120, 122 and 124, in the case of the connector 27, and having contact parts connected to conductors 126, 128 and 130 in the case of the connector 28. The control box end of the cable assembly is the single stem of the Y and the six conductors 120–130 are connected to a unitary six connection bayonet connector.

What is claimed is:

1. A system for the identification of an electrofusion fitting from a range of fittings each of which has a predetermined characteristic, the system comprising a control unit which is connected to a fitting and which forms a voltage divider network including a fixed resistor in the unit and an identification resistor, the control unit using a reference voltage across the fixed resistor, the improvement wherein there are two identification resistors in or associated with the fitting and the control unit first forms the divider network including the first identification resistor and determines a first voltage across the fixed resistor, then substitutes the first by the second identification resistor and determines a second voltage across the fixed resistor, the first and second voltages being used to determine the desired predetermined characteristic of the fitting.

2. A system according to claim 1, wherein both identification resistors are part of the fitting.

3. A system according to claim 2, wherein each identification resistor is connected between one of two heater terminals and one of two identification terminals.

4. A system according to claim 1 wherein the control unit is connected to the fitting by two conductors for energising a heater element of the fitting and third, fourth and fifth further conductors, an electrical path for the determination of the first voltage comprising the fourth and third conductors and an electrical path for the determination of the second voltage comprising the fifth and fourth conductors and each of the electrical paths including semiconductor devices which prevent unwanted current flow, an electrical path to a differential amplifier being provided by the third and fifth conductors when the control unit box changes its connections internally.

5. A system according to claim 1 wherein the control unit is connected to the fitting by two conductors for energising a heater element of the fitting and third, fourth, fifth and sixth further conductors, an electrical path for the determination of the first voltage comprising the third and fourth conductors and an electrical path for the determination of the second voltage comprising the third conductor, the heating element and the fifth conductor, an electrical path to a differential amplifier being provided by the third and sixth conductors when the control box changes its connections internally.

* * * * *